(12) United States Patent
Mathur et al.

(10) Patent No.: US 12,739,239 B1
(45) Date of Patent: Sep. 15, 2026

(54) OPTIMIZED MUTUAL TRANSPORT LAYER SECURITY (MTLS) AUTHENTICATION

(71) Applicant: Bank of America Corporation, Charlotte, NC (US)

(72) Inventors: Tarun Mathur, Plainsboro, NJ (US); David C. Tyson, Waxhaw, NC (US); Carey O. Goldson, Holmdel, NJ (US); Thomas Joseph, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 31 days.

(21) Appl. No.: 19/081,009

(22) Filed: Mar. 17, 2025

(51) Int. Cl.
*H04L 9/40* (2022.01)

(52) U.S. Cl.
CPC ........ *H04L 63/0823* (2013.01); *H04L 63/166* (2013.01)

(58) Field of Classification Search
CPC .......................... H04L 63/0823; H04L 63/166
See application file for complete search history.

(56) References Cited

U.S. PATENT DOCUMENTS 7,853,782 B1 * 12/2010 Geddes ................ G06Q 20/027 713/153
9,172,679 B1 * 10/2015 Geddes ............... H04L 63/0884
11,784,808 B2 * 10/2023 Sheth ...................... G06F 21/57
2026/0100972 A1 * 4/2026 Bruce ................... H04L 9/3263

* cited by examiner

*Primary Examiner* — Han Yang
(74) *Attorney, Agent, or Firm* — Weiss & Arons LLP

(57) ABSTRACT

Systems and methods for secure digital communication with reduced resource utilization are provided. Systems and methods may include utilizing an intermediate node. Systems and methods may include establishing secure communication links between one or more client nodes and the intermediate node and between the intermediate node and one or more server nodes.

20 Claims, 5 Drawing Sheets

OPTIMIZED MUTUAL TRANSPORT LAYER SECURITY (MTLS) AUTHENTICATION

FIELD OF TECHNOLOGY

Aspects of the disclosure relate to digital systems. Specifically, aspects of the disclosure relate to systems and methods for improved authentication in digital systems.

BACKGROUND OF THE DISCLOSURE

As digital systems continue to evolve and become ever more widespread, securing communications and verifying identities remain critical challenges. Traditional authentication methods often rely on static credentials, which can be vulnerable to misuse, theft, or unauthorized access. With the increasing complexity of modern networks, stronger authentication mechanisms are necessary to ensure the integrity and confidentiality of sensitive data exchanges, including those essential for digital transactions, cloud applications, and other critical systems.

One widely adopted approach for secure communication is Transport Layer Security (TLS), which encrypts data in transit and verifies server identities. Mutual TLS (mTLS) extends this by requiring authentication from both parties, enhancing trust and preventing unauthorized access. Existing mTLS implementations, however, can be cumbersome and inefficient, with challenges related to certificate management, scalability, and security and performance issues that arise from static or expired credentials.

It would be desirable, therefore, to provide systems and methods for improved secure digital communication, including within mTLS protocols.

SUMMARY OF THE DISCLOSURE

Aspects of the disclosure relate to methods for secure digital communication with reduced resource utilization. A method may include transmitting, from a client node, a client digital certificate. The client digital certificate may include a unique client identifier.

The method may include receiving, at an intermediate node, the client digital certificate. The method may include validating, at the intermediate node, the client digital certificate. The validating may include confirming that the client digital certificate is non-expired and is associated with a trusted certificate authority (CA).

When the client digital certificate is successfully validated, the method may include establishing a first secure communication link between the client node and the intermediate node. The method may include transmitting, from the intermediate node to a server node, the unique client identifier and an intermediate node digital certificate.

The method may include validating, at the server node, the intermediate node digital certificate and the unique client identifier. Validating the unique client identifier may include confirming that the unique client identifier is included in a list of trusted clients that is stored at the server node.

When the intermediate node digital certificate and the unique client identifier are successfully validated at the server node, the method may include establishing a second secure communication link between the intermediate node and the server node.

The method may include transmitting messages bi-directionally between the client node and the server node through the first and second secure communication links via the intermediate node.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
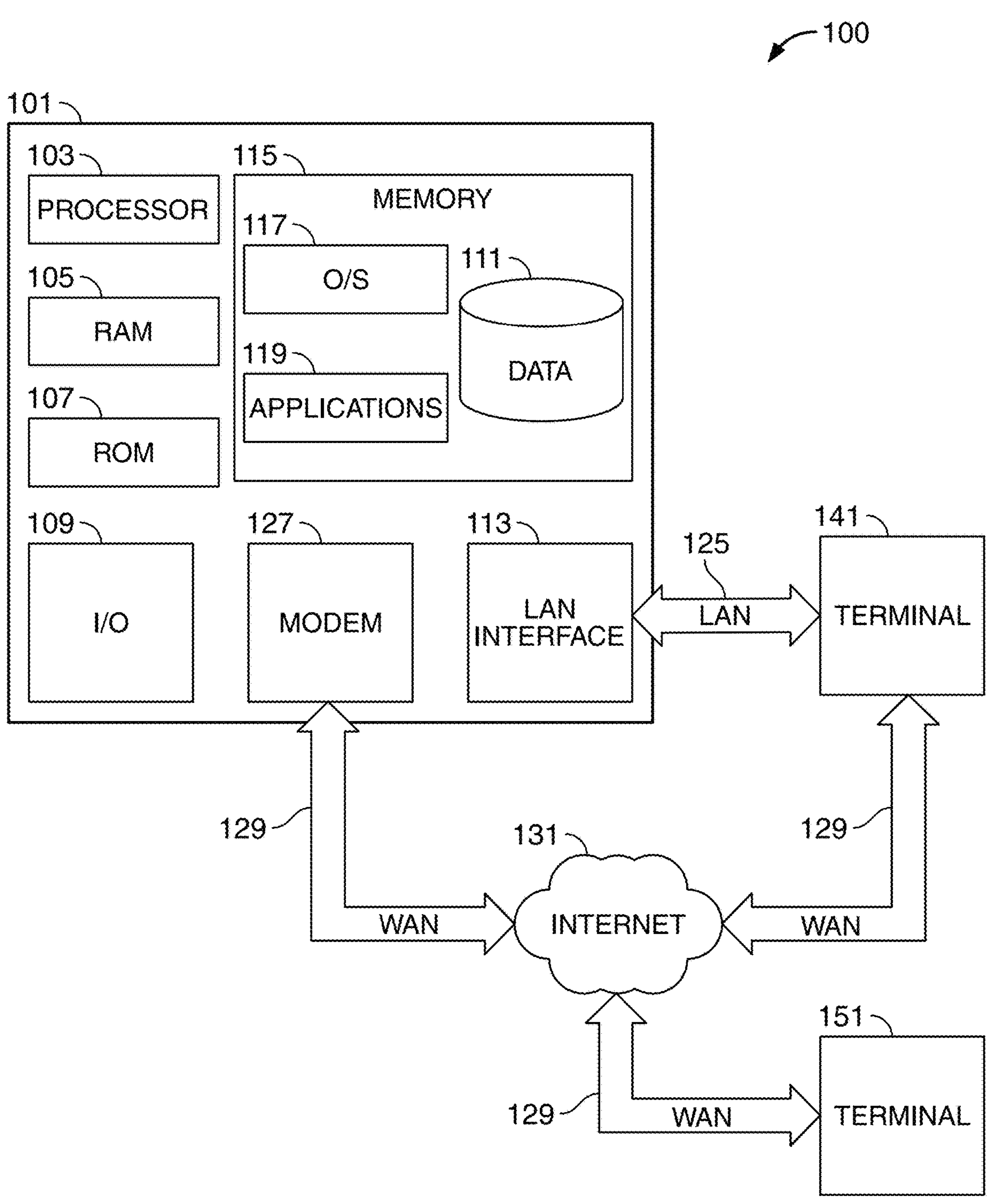
FIG. 1 shows an illustrative system in accordance with principles of the disclosure.

Aspects of the disclosure relate to systems and methods for secure digital communication with reduced resource utilization. Systems may include a memory, a processor, and computer executable instructions stored in the memory that, when run on the processor, may be configured to implement system features or execute method steps. System features and configurations may, in certain embodiments, correspond to steps of the methods.

Methods may include transmitting, from a client node, a client digital certificate. The client digital certificate may include a unique client identifier. The unique client identifier may include an alphanumeric sequence that is unique to each client node. The client digital certificate (and/or any other digital certificate referenced herein, including, for example, an intermediate node certificate and a server node certificate) may implement an X.509 digital certificate protocol.

The method may include receiving, at an intermediate node, the client digital certificate. The intermediate node may, in some embodiments, be a load balancer. A load balancer is a network element that may include hardware and/or software and which acts to distribute and manage traffic efficiently between clients and servers in the network.

The load balancer may be a Layer 7 load balancer. A network may include seven layers according to the Open Systems Interconnection (OSI) seven-layer model (which includes Physical, Data Link, Network, Transport, Session, Presentation, and Application layers). A Layer 7 load balancer may operate at the application layer, the highest level of the OSI seven-layer network. Operating at this layer provides the load balancer access to detailed information such as the characteristics of the HTTP/HTTPS header, message content, URL type, and cookie data.

The load balancer may be a Local Traffic Manager (LTM) load balancer. An LTM load balancer may actually route traffic to a server in a local network (rather than a non-LTM balancer, which may merely suggest a destination IP address for a network transmission). Aspects of an exemplary LTM load balancer are described at https://www.f5.com/products/big-ip-services/local-traffic-manager.

The method may include validating, at the intermediate node, the client digital certificate. The validating may include confirming that the client digital certificate is non-expired and is associated with a trusted certificate authority (CA). Digital certificate expiration and CA information may be included in the digital certificate.

When the client digital certificate is successfully validated, the method may include establishing a first secure communication link between the client node and the intermediate node.

The method may include transmitting, from the intermediate node to a server node, an intermediate node digital certificate. The method may include transmitting, from the intermediate node to a server node, the unique client identifier. Transmitting the unique client identifier from the intermediate node to the server node may, in certain embodiments, include embedding the unique client identifier in a header of a request packet transmitted from the intermediate node to the server node.

The method may include validating, at the server node, the intermediate node digital certificate. Validating the intermediate node digital certificate at the server node may include confirming that the intermediate node digital certificate is non-expired and is associated with a trusted CA.

The method may include validating, at the server node, the unique client identifier. Validating the unique client identifier may include confirming that the unique client identifier is included in a list of trusted clients that is stored at the server node. In some embodiments, client identifiers may be added to the list in response to successful validation at the intermediate node. The successful validation at the intermediate node may have occurred in a prior communication. In certain embodiments, the list of trusted clients may be curated and maintained by a network administrator.

When the intermediate node digital certificate and the unique client identifier are successfully validated at the server node, the method may include establishing a second secure communication link between the intermediate node and the server node.

The method may include transmitting messages bi-directionally between the client node and the server node through the first and second secure communication links via the intermediate node. The intermediate node may thus operate as an intermediary to facilitate secure end-to-end communication between the client and server nodes by effectively merging two separate secure tunnels (e.g., mTLS links), while relieving the server node of the need to save resource-heavy information (e.g., client certificates and/or keys) aside from the list of trusted client IDs.

In certain embodiments, as part of establishing the first secure communication link, the intermediate node may transmit the intermediate node digital certificate to the client node. In some embodiments, as part of establishing the second secure communication link, the server node may transmit a server digital certificate to the intermediate node.

In some embodiments, one or more of the secure communications in the system may implement a mutual transport layer security (mTLS) communication protocol. The first and second secure communication links may each separately implement an mTLS communication protocol.

In certain embodiments, the client node may be one of a plurality of client nodes. The server node may be one of a plurality of server nodes. The intermediate node, however, may be a single intermediate node that supports the first and second secure communication links with the plurality of client nodes and the plurality of server nodes. An advantage of the disclosed systems and methods includes the ability to store most of the client information needed for secure communications (e.g., certificates and public keys of dozens or even hundreds of clients) only one time at the intermediate node rather than storing this information at each of many server nodes, thereby reducing resource utilization in the network.

In some embodiments, when the client digital certificate fails validation at the intermediate node or when the unique client identifier fails validation at the server node, connection between the client node and the intermediate and server nodes may be terminated. In certain embodiments, the unique client identifier may be removed from the list of trusted clients on the server node in response to failed validation of the client digital certificate at the intermediate node.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may comprise any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to digital communications. The input/output module may also include one or more speakers for providing audio output and a video display device for providing textual, audio, audiovisual, and/or graphical output. The input and output may be related to computer application functionality. The input and output may be related to digital communications.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to digital communications.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
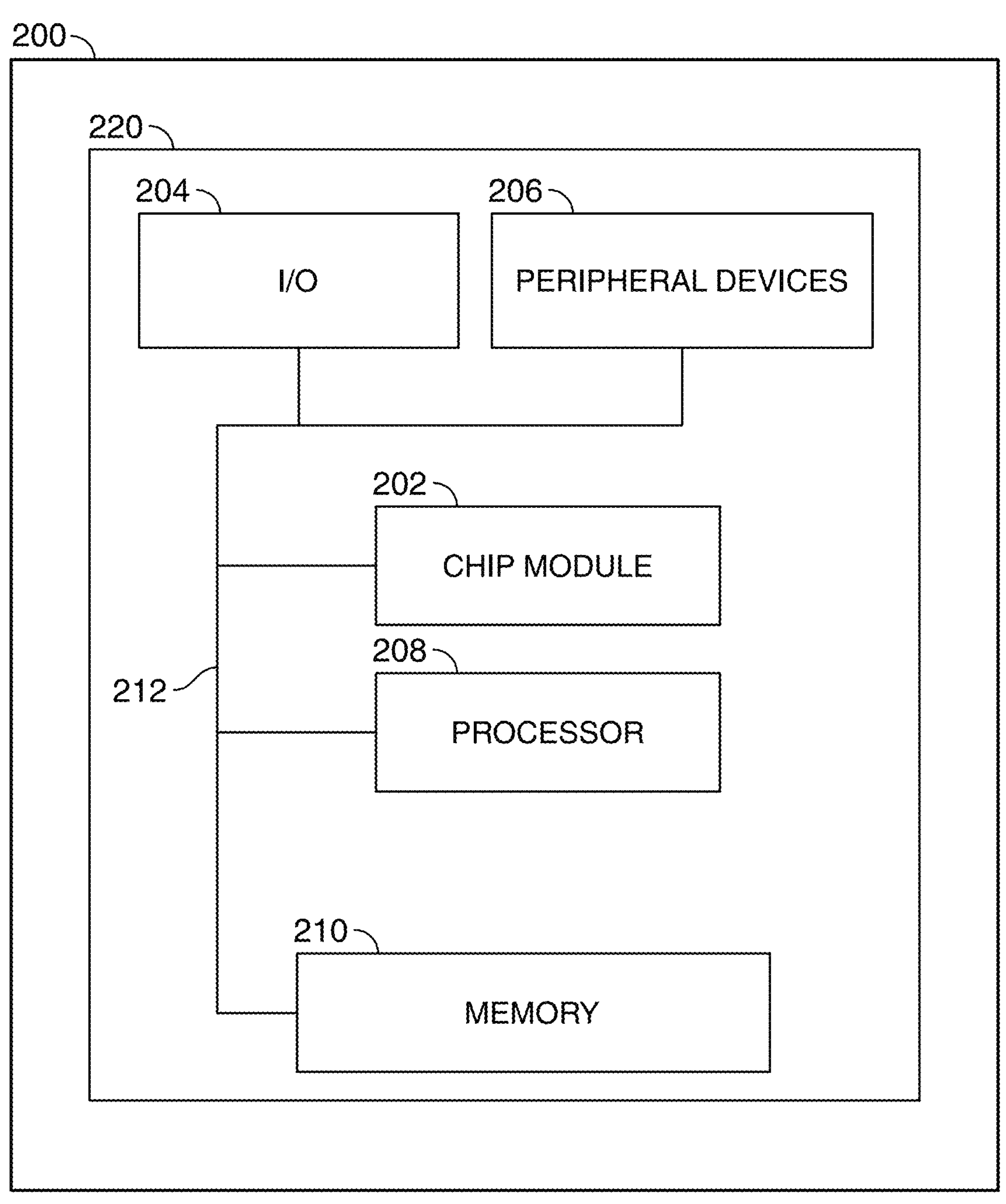
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
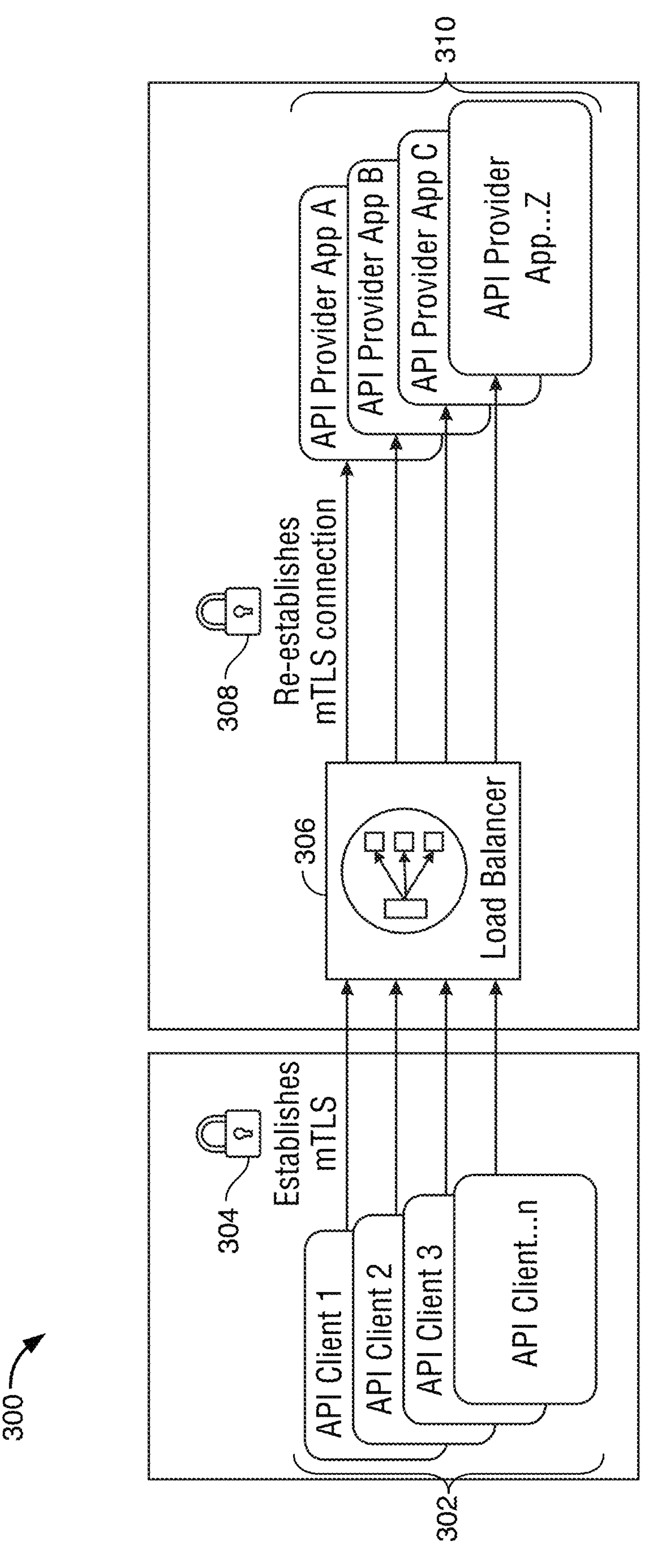
FIG. 3 shows an illustrative diagram in accordance with principles of the disclosure.

FIG. 3 shows illustrative diagram 300 in accordance with principles of the disclosure. Client nodes 1-*n* (302) may establish mTLS links (304) with load balancer 306. Load balancer 306 may establish separate mTLS links (308) with Server nodes A-Z (310).

The network arrangement shown in diagram 300 may operate according to the following illustrative steps:

- Step 1: API Clients Presents Certificate. API Client 1 (one of Client nodes 1-*n* (302)) may initiate an mTLS connection by presenting its client certificate to the load balancer (306). This certificate may be used to establish a secure connection (304), ensuring the authenticity of the client.
- Step 2: Load Balancer Validates Certificate. Load balancer 306 (e.g., an LTM Layer 7 load balancer) may receive the client's certificate and validate it. In some embodiments, upon successful validation, the load balancer may terminate the initial mTLS connection. The load balancer then may re-establish an mTLS connection between itself and the API client, ensuring secure communication.
- Step 3: Append Client Information to Header. The load balancer (306) may extract the client's unique identifier (e.g., a Distinguished Name (DN)) from the client's digital certificate. This DN may serve as an identifier for the client and may be included in communication with the API provider (e.g., one of Server nodes A-Z (310)). For example, the load balancer (306) may append the identifier into a request header of a communication packet sent to the API provider (see Step 5 below).

Step 4: mTLS Connection Established with API Provider. The load balancer (306) may establish an mTLS connection with the API Provider App A. The API provider may validate the load balancer's certificate to establish a secure connection (308). This setup may provide a secure end-to-end communication channel, with the load balancer acting as an intermediary.

Step 5: Authorization Using Load Balancer Certificate and Client Information. The API Provider may use the load balancer's certificate and the client information (e.g., the identifier extracted from the request header) to authorize the client. The provider may maintain a property file for client certificate information but may only validate the identifier (e.g., the DN). This approach may enable the API provider to authorize clients without directly storing or managing the client certificates, reducing the complexity of certificate management.

Figure 4:
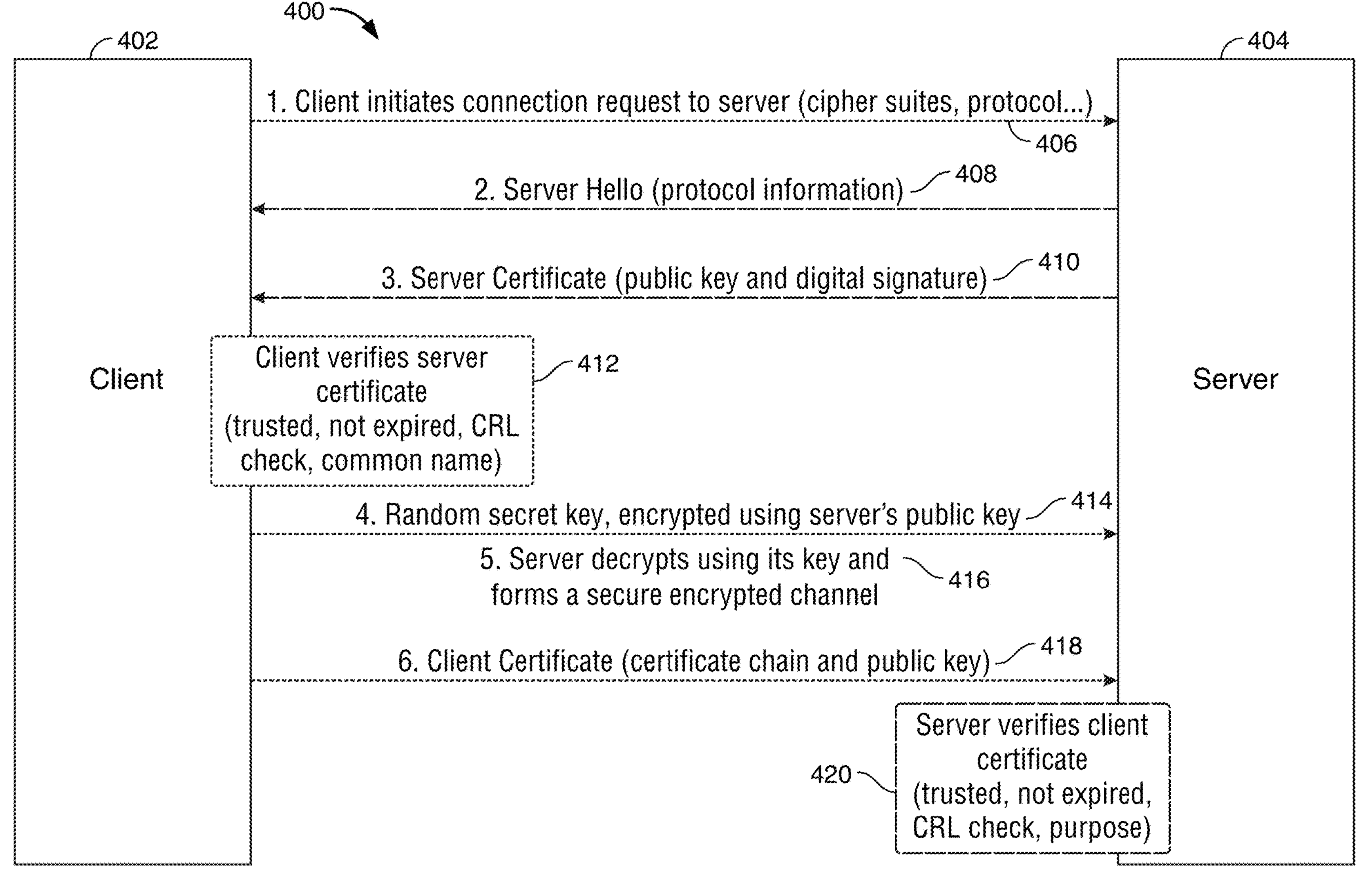
FIG. 4 shows another illustrative diagram in accordance with principles of the disclosure.

FIG. 4 shows illustrative diagram 400 in accordance with principles of the disclosure. Diagram 400 includes steps of an mTLS secure communication link between two nodes, for example between client 402 and server 404.

At step 406 client 402 may initiate a connection request with server 404. This request may include a "hello." This request may include client information such as cipher suites (i.e., a set of security algorithms) or protocols used by client 402.

At step 408 server 404 may respond. The response may include a "hello." The response may include information regarding protocols used by server 404.

At step 410 server 404 may transmit its digital certificate to client 402. The certificate may include a public key and a digital signature of server 404. The certificate may be an X.509 digital certificate.

X.509 digital certificate protocol is an International Telecommunication Union (ITU) standard defining a format for public key certificates. X.509 certificates support many Internet protocols as well as offline applications such as electronic signatures.

An X.509 certificate may link a subject (e.g., a user, device, or service) to a public key using a digital signature. A certificate may be digitally signed and include information about the subject, a public key (using, e.g., RSA, DSA, ECDSA, ed25519, etc.) that corresponds to the subject's private key, information about the issuing certificate authority (CA), the supported encryption and/or digital signing algorithms, and information to determine the revocation and validity status of the certificate.

The certificate may be signed by a CA or may be self-signed. When a certificate is signed by a trusted CA, or validated by other means, the certificate holder may use the public key it contains to establish secure communications with another party, or validate documents digitally signed by the corresponding private key.

The X.509 digital certificate (or other digital certificate in the system) may, for example, include one or more of the fields shown and described in the table below:

| Field | Description |
|---|---|
| Version | Version number of the certificate format. |
| Serial Number | Serial number of the certificate. May be assigned by issuer and may be unique within issuer's list of issued certs. |
| Algorithm Identifier/ Parameters | Signature algorithm and/or any parameters used by issuer. |

-continued

| Field | Description |
|---|---|
| Issuer | Name of certification Authority (CA) which issued the certification. |
| Not Before (Date) | Cert invalid before this date. |
| Not After (Date) | Cert invalid (expired) after this date. |
| Subject Name | Unique identifier of entity to whom cert is being issued. Field may also include information about recipient (e.g., location, type of entity, etc.). |
| Subject Public Key Algorithm/Parameters | Algorithm and/or any parameters used for subject's public key. |
| Subject Public Key | The actual public key (a bit string). |
| Signature | Signature as provided by issuer. |

At step 412 client 402 may verify server's certificate. Verification may include confirming that the CA is trusted and that the certificate is not expired. Verification may also include a certificate revocation list (CRL) check, and may also check a common name included in the certificate. A CRL may be a list issued by a CA containing digital certificates that have been deemed invalid by the CA. CRLs may be formatted and distributed as defined by a standard protocol such as X.509.

At step 414 the client may generate a secret key (which may be encrypted using server's public key) and may transmit the secret key to server 404.

At step 416, server 404 may decrypt the secret key using its key (this may be a private key), and may form a secure encrypted channel with client 402.

At step 418 client 402 may transmit its digital certificate. The certificate may include a certificate chain and a public key. A certificate chain may include a root certificate and one or more intermediate certificates. A root certificate may be the highest level of trust in a certificate chain. The root certificate may be pre-installed in a system and may act as the foundation for verifying other, intermediate, certificates. The intermediate certificates may act as a middle layer that connects a root certificate to individual server or client certificates. Utilizing certificate chains may increase security and flexibility in the mTLS ecosystem, and may also facilitate improved certificate management through the use of different scope or purpose for different levels of certificate.

At step 420 server 404 may verify client's certificate. Verification may include confirming that the CA is trusted and that the certificate is not expired. Verification may also include a certificate revocation list (CRL) check, and may also check a purpose included in the certificate.

Figure 5:
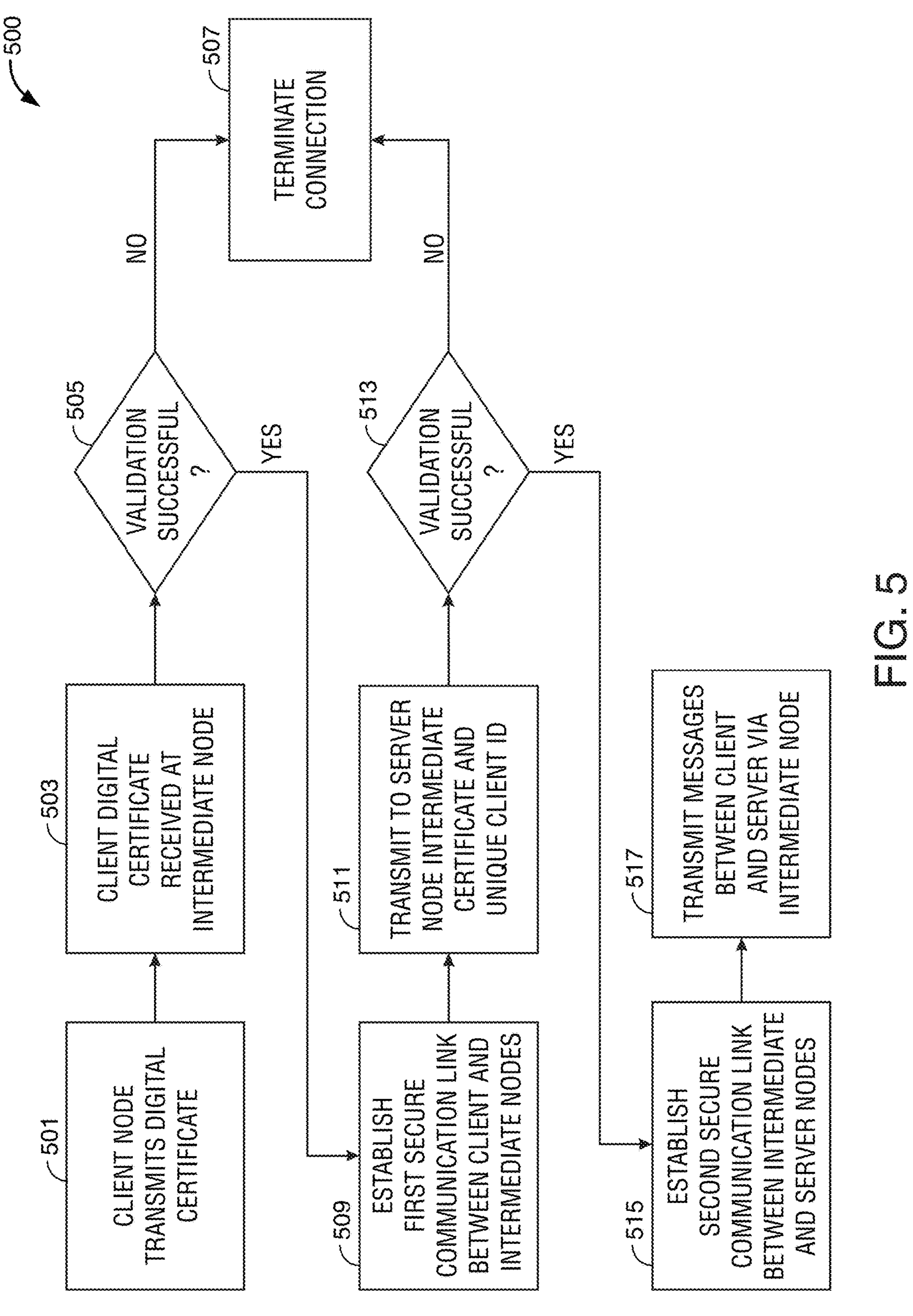
FIG. 5 shows an illustrative flowchart in accordance with principles of the disclosure.

FIG. 5 shows illustrative flowchart 500 in accordance with principles of the disclosure. At step 501 the client node transmits its digital certificate. This may be done alongside, or subsequent to, a "hello" communication from the client to initiate a connection.

At step 503 the client digital certificate may be received at an intermediate node (instead of at a server node, as may be the case with other mTLS methods). At step 505 the intermediate node validates the client certificate. If validation fails, connection is terminated at 507. If validation succeeds, a first secure communication link is established between the client node and the intermediate node at 509. The intermediate node may then transmit its digital certificate and a unique identifier of the client node (which may be extracted from the client digital certificate) to the server node at 511.

At step 513, the server node validates the intermediate node digital certificate and the client unique identifier. If validation fails, connection is terminated at 507. If validation succeeds, a second secure communication link is established between the intermediate node and the server node at 515. At 517, messages are transmitted between the client node and the server node over the first and second communication links via the intermediate node.

The systems and methods disclosed herein may thereby provide improved secure digital communication, including within mTLS protocols. Challenges and disadvantages associated with prior art secure communications include:

Storage Complexity: The API provider (i.e., a server node) must maintain a storage system for the public keys of all clients, which can be highly complex, especially when there are more than 100 clients for a single API.

Certificate Validity and Renewal: Client certificates come with predefined validity periods and require ongoing monitoring to prevent expiration. The API provider is tasked with tracking certificate lifecycles and ensuring timely renewals. Failing to renew a certificate on time can cause disruptions to authentication, potentially impacting service availability.

Operational Overhead: The management of certificate storage, validation, and renewal demands significant operational resources. Continuous monitoring, repository updates, and coordinating with clients for certificate renewals can be resource intensive.

Risk of Expired Certificates: In a production environment, client certificates can occasionally expire if they are not renewed promptly, leading to unexpected service outages or denial of access for legitimate clients, resulting in a degraded user experience.

Lifecycle Management Complexity: Managing client certificates from issuance to revocation adds further operational complexity for API providers, especially in large-scale systems with numerous clients, potentially increasing the likelihood of errors.

Systems and methods according to the present disclosure resolve many of the aforementioned challenges by, for example, utilizing mutual TLS (mTLS) in combination with a Layer 7 load balancer to authenticate clients of a web service provider without requiring the storage and management of client certificates at the server nodes. The authentication workload is offloaded to the load balancer, reducing overhead and resource utilization at the API provider.

Benefits provided by the present disclosure may include:

Simplified and Secure Client Onboarding, Maintenance, and Offboarding: No certificates are exchanged between the client and the API provider. Instead, only the unique identifier (which may be a Distinguished Name (DN)) from X.509 certificates are provided to the API provider. API providers maintain a list of these DNs, simplifying the onboarding and management process. Removing a client simply involves eliminating the client's DN from the authorized list, streamlining the offboarding process and reducing operational overhead.

Improved Security with Load Balancer Certificate Revocation List (CRL) Checks: The load balancer performs CRL checks to block clients with revoked certificates from accessing the API provider, ensuring that compromised certificates do not lead to unauthorized access.

Protection Against Expired Certificates: Clients with expired certificates are effectively prevented from connecting to the API provider due to validation checks performed by the load balancer.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for optimized Mutual Transport Layer Security (mTLS) authentication are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for secure digital communication with reduced resource utilization, the method comprising:

transmitting, from a client node, a client digital certificate, wherein said client digital certificate comprises a unique client identifier;

receiving, at an intermediate node, the client digital certificate;

validating, at the intermediate node, the client digital certificate, wherein said validating comprises confirming that the client digital certificate is non-expired and is associated with a trusted certificate authority (CA);

when the client digital certificate is successfully validated at the intermediate node:

establishing a first secure communication link between the client node and the intermediate node;

transmitting, from the intermediate node to a server node, the unique client identifier and an intermediate node digital certificate; and validating, at the server node, the intermediate node digital certificate and the unique client identifier, wherein validating the unique client identifier comprises confirming that the unique client identifier is included in a list of trusted clients that is stored at the server node; and when the intermediate node digital certificate and the unique client identifier are successfully validated at the server node:

establishing a second secure communication link between the intermediate node and the server node; and transmitting messages bi-directionally between the client node and the server node through the first and second secure communication links via the intermediate node.

2. The method of claim 1 wherein:

as part of establishing the first secure communication link, the intermediate node transmits the intermediate node digital certificate to the client node; and as part of establishing the second secure communication link, the server node transmits a server digital certificate to the intermediate node.

3. The method of claim 2 wherein the first and second secure communication links each separately implement mutual transport layer security (mTLS) communication protocol.

4. The method of claim 1 wherein:

the client node is one of a plurality of client nodes;

the server node is one of a plurality of server nodes; and the intermediate node is a single intermediate node that supports the first and second secure communication links with the plurality of client nodes and the plurality of server nodes.

5. The method of claim 1 further comprising, when the client digital certificate fails validation at the intermediate node or when the unique client identifier fails validation at the server node, terminating connection between the client node and the intermediate and server nodes.

6. The method of claim 1 wherein the intermediate node is a load balancer.

7. The method of claim 6 wherein the load balancer is a Layer 7 load balancer.

8. The method of claim 6 wherein the load balancer is a Local Traffic Manager (LTM) load balancer.

9. The method of claim 1 wherein the client and intermediate node digital certificates implement X.509 digital certificate protocol.

10. The method of claim 1 wherein the transmitting of the unique client identifier from the intermediate node to the server node comprises embedding the unique client identifier in a header of a request packet transmitted from the intermediate node to the server node.

11. A system for secure digital communication with reduced resource utilization, the system comprising a processor, a non-transitory memory, and a set of computer executable instruction stored in the memory that, when run on the processor, are configured to:

transmit, from a client node, a client digital certificate, wherein said client digital certificate comprises a unique client identifier;

receive, at an intermediate node, the client digital certificate;

validate, at the intermediate node, the client digital certificate, wherein said validating comprises confirming that the client digital certificate is non-expired and is associated with a trusted certificate authority (CA);

when the client digital certificate is successfully validated at the intermediate node:

establish a first secure communication link between the client node and the intermediate node;

transmit, from the intermediate node to a server node, the unique client identifier and an intermediate node digital certificate;

validate, at the server node, the intermediate node digital certificate and the unique client identifier, wherein validating the unique client identifier comprises confirming that the unique client identifier is included in a list of trusted clients that is stored at the server node; and when the intermediate node digital certificate and the unique client identifier are successfully validated at the server node:

establish a second secure communication link between the intermediate node and the server node; and transmit messages bi-directionally between the client node and the server node through the first and second secure communication links via the intermediate node.

12. The system of claim 11 wherein:

as part of establishing the first secure communication link, the intermediate node transmits the intermediate node digital certificate to the client node; and as part of establishing the second secure communication link, the server node transmits a server digital certificate to the intermediate node.

13. The system of claim 12 wherein the first and second secure communication links each separately implement mutual transport layer security (mTLS) communication protocol.

14. The system of claim 11 wherein:

the client node is one of a plurality of client nodes;

the server node is one of a plurality of server nodes; and the intermediate node is a single intermediate node that supports the first and second secure communication links with the plurality of client nodes and the plurality of server nodes.

15. The system of claim 11 further configured, when the client digital certificate fails validation at the intermediate node or when the unique client identifier fails validation at the server node, to terminate connection between the client node and the intermediate and server nodes.

16. The system of claim 11 wherein the intermediate node is a load balancer.

17. The system of claim 16 wherein the load balancer is a Layer 7 load balancer.

18. The system of claim 16 wherein the load balancer is a Local Traffic Manager (LTM) load balancer.

19. The system of claim 11 wherein the client and intermediate node digital certificates implement X.509 digital certificate protocol.

20. The system of claim 11 wherein to transmit the unique client identifier from the intermediate node to the server node the unique client identifier is embedded in a header of a request packet transmitted from the intermediate node to the server node.

* * * * *